United States Patent [19]

Ishiguro et al.

[11] Patent Number: 5,041,859
[45] Date of Patent: Aug. 20, 1991

[54] AUTOMATIC FOCUSING DETECTION DEVICE FOR CAMERAS

[75] Inventors: Yasuaki Ishiguro, Fujimi; Osamu Ikeda, Yokohama; Nobuo Matsukawa, Tokyo, all of Japan

[73] Assignee: Nikon Corporation, Tokyo, Japan

[21] Appl. No.: 567,691

[22] Filed: Aug. 13, 1990

Related U.S. Application Data

[63] Continuation of Ser. No. 413,629, Sep. 28, 1989, abandoned.

[30] Foreign Application Priority Data

Oct. 4, 1988 [JP] Japan ................................ 63-250313
Oct. 28, 1988 [JP] Japan ................................ 63-274191
Oct. 28, 1988 [JP] Japan ................................ 63-274192

[51] Int. Cl.$^5$ .............................................. G03B 13/00
[52] U.S. Cl. ............................... 354/400; 354/402
[58] Field of Search ........................ 354/400–409, 354/412

[56] References Cited

U.S. PATENT DOCUMENTS 4,705,382 11/1987 Mukai et al. ...................... 354/402
4,768,052 8/1988 Hamada et al. .................. 354/406
4,800,409 1/1989 Matsuda et al. .................. 354/402
4,831,403 5/1989 Ishida et al. ...................... 354/406

FOREIGN PATENT DOCUMENTS 61-55620 3/1986 Japan .
62-255921 11/1987 Japan ................................ 354/402

Primary Examiner—Russell E. Adams
Assistant Examiner—David M. Gray
Attorney, Agent, or Firm—Shapiro and Shapiro

[57] ABSTRACT

An automatic focusing detection apparatus for a camera includes focused-state detection devices for detecting the focused state in each of a plurality of focusing detection areas which consist of a central area and a plurality of focusing detection areas adjacent to the central area defined by dividing an image field, and a control device. In response to the replacement of a focusing screen which has one or more subject distance measurement frames each defining a focusing detection area and which is detachably mounted on the camera, to the switching between the automatic focusing adjustment mode and the manual focusing adjustment mode and/or to the switching between the automatic exposure adjustment mode and the manual exposure adjustment mode, the control device selects one or more focusing detection areas and, in response to the detection signal(s) from the focused-state detection device(s) corresponding to the selected one or more focusing detection areas, controls a lens driving device so that a photographic lens is brought to a position at which a subject is sharply focused on the image plane.

16 Claims, 9 Drawing Sheets (a)      (b)

(c)      (d)

(a)      (b)

(c)      (d)

(a)      (b)

(c)      (d)

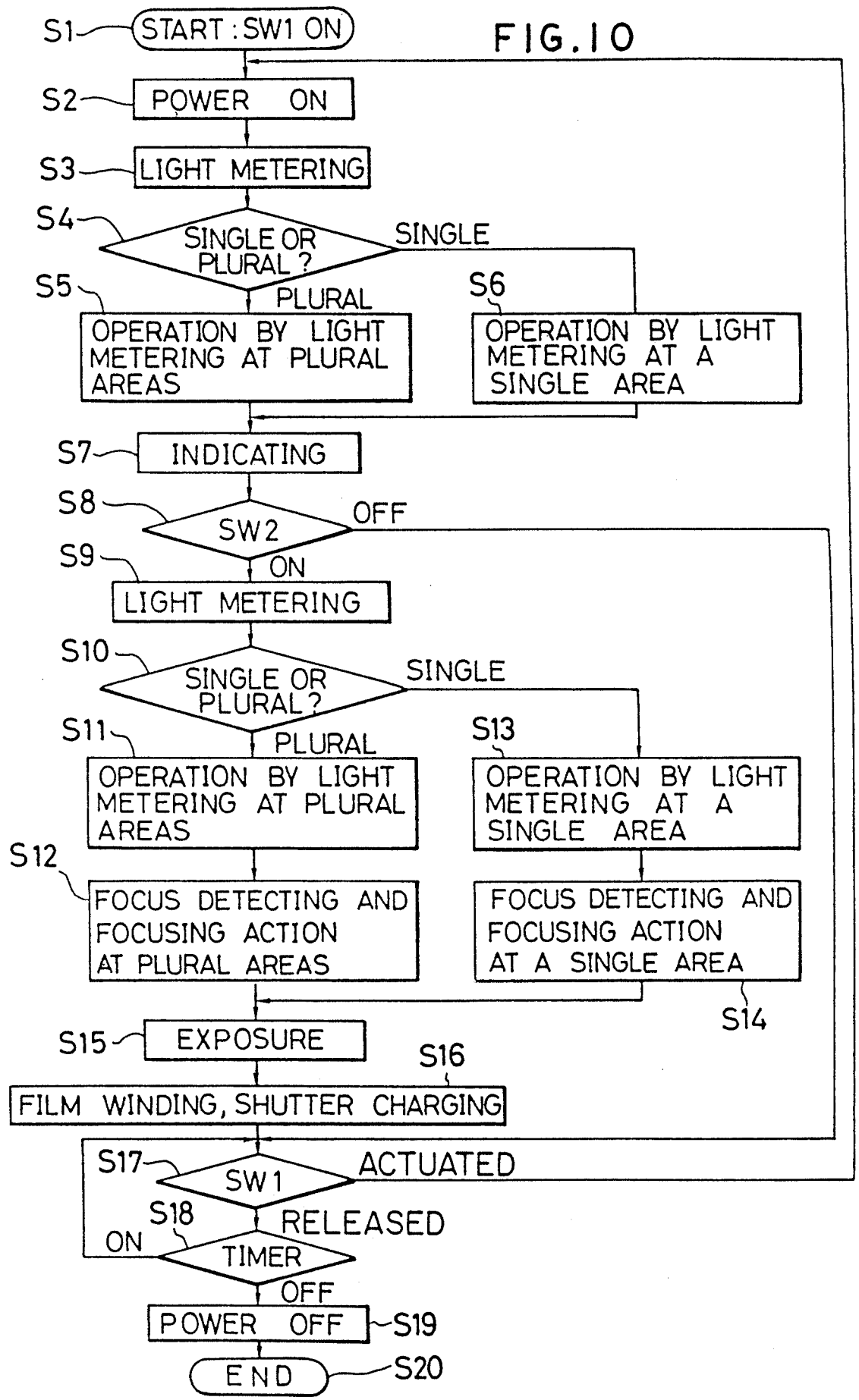

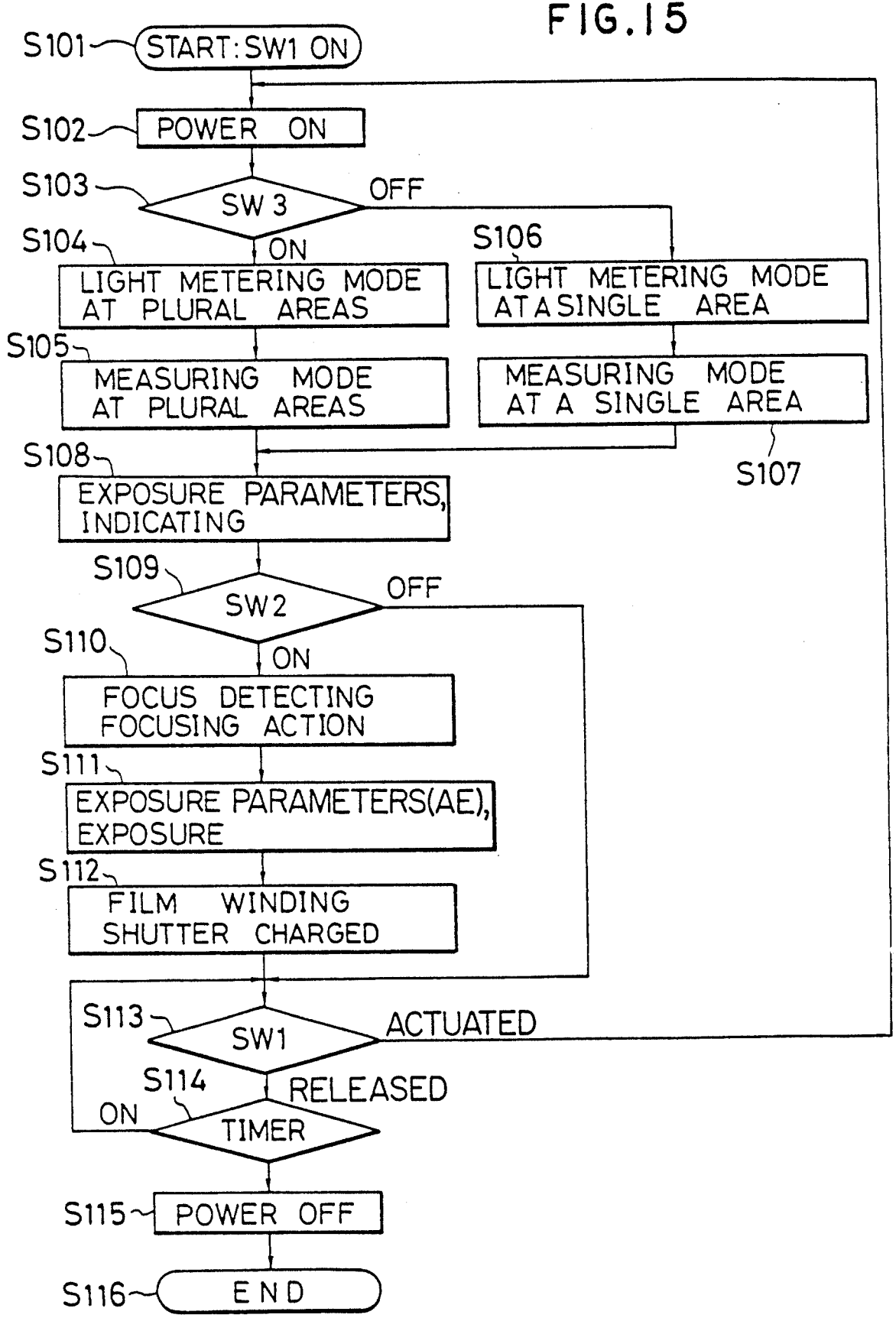

AUTOMATIC FOCUSING DETECTION DEVICE FOR CAMERAS

This is a continuation of application Ser. No. 413,629 filed Sept. 28, 1989, now abandoned.

BACKGROUND OF THE INVENTION

1. Field of the Invention

The present invention relates to an automatic focusing detection device for cameras and more particularly an automatic focusing detection device for cameras capable of dividing an image field into a plurality of sections and of measuring the distances from a camera lens to the subject (subject distances) in each section of the divided field.

2. Related Background Art

A camera capable of dividing an image field into a plurality of sections and measuring the distance each of them is well known in the art as disclosed in Japanese Laid-Open Patent Application Nos. 61-55620 and 62-255921.

In the case of the camera equipped with an automatic focusing detection device of the type disclosed in Laid Open Japanese Patent Application No. 61-55620, an operator operates a switch mounted in the camera in order to select a first mode in which a lens driving motor is controlled based on the results of the distance measurements for plural sections or a second mode in which the lens driving motor is controlled based on the result of the distance measurement for a single focusing detection section corresponding to the center of a frame of a film.

However, in such a case of the conventional camera, a specially designed selection switch must be mounted on the camera. This undesirably reduces the space available for other components.

In the case of the camera disclosed in Laid-Open Japanese Patent Application No. 62-255921, the subject distances for a plurality of sections of the image field are measured by photocells each disposed in opposing relationship with a corresponding section, and the sections which can be focused within the depth of field are measured. Thereafter, a degree of luminance of one or more sections is detected on the assumption that a main subject or object exists within the depth of field. That is, when there is only one section that can be focused within the depth of field, the intensity of a light of this section is measured. When there are more than one such sections, the average of the intensity of light from the sections is used as measured intensity. The above-described camera needs no mechanism for selecting one or more sections whose subject distances must be measured and no mechanism for selecting one or more light measuring sections.

In the above-described system, a section to be focused based on the subject distances of respective sections is determined first and then light of the selected section is measured. However, in spite of the intention of a photographer, there may occur a case in which subject distances are measured not only for a single section which contains a main subject, but for a plurality of sections including the above-mentioned single section. In this case, an exposure value is determined by carrying out the arithmetic operation of the measured light of multiple sections. As a result, when one or more sections have a high degree of luminance as in the case of rear light, it is difficult to photograph a main subject with a correct exposure value. Furthermore, it is also difficult to correctly focus a main subject which a photographer desires to photograph.

SUMMARY OF THE INVENTION

In view of the above, one of the objects of the present invention is to provide an automatic focusing detection apparatus for a camera which can select one or more focusing detection areas out of a plurality of focusing detection areas without any error and without the need of an exclusive operating mechanism, and which can sharply focus a subject using the focusing detection area or areas selected.

Another object of the present invention is to provide an automatic focusing detection apparatus in which a plurality of subject distance measurement areas are suitably made to correspond to a plurality of light measurement areas, so that an optimum exposure value can be obtained and a subject which a photographer intends to photograph can be sharply focused.

To the above and other ends, an automatic focusing detection apparatus for a camera in accordance with the present invention comprises a focused-state detection means for detecting a focused state n each of a plurality of focusing detection areas, including a central area and a plurality of areas adjacent to said central area defined by dividing an image field, and also comprises a control means.

In response to the replacement of a focusing screen which has one or more subject distance measurement sections each defining a focusing detection area and which is detachably mounted on the camera, and in response to the switching between the automatic focusing adjustment mode and the manual focusing adjustment mode and the switching between the automatic exposure adjustment mode and the manual exposure adjustment mode, said control means determines whether one or more focusing detection areas are used. Based on the detection signals from focused-state detection means corresponding to said selected one or more focusing detection areas, the control means controls a lens driving device so that a photographic lens is brought to a position at which a subject is sharply focused on the image plane. Therefore, without adding an exclusive operation mechanism, one or more focusing areas can be selected.

An automatic focusing detection apparatus in accordance with another aspect of the present invention may comprise light measurement means for carrying out the light measurement at each of a plurality of light measurement areas defined by dividing an image field; focused-state detection means for detecting the focused state depending upon the subject distance from each divided area; arithmetic operation means for computing an exposure value based on the output of the light measurement of a selected light measurement area or areas; arithmetic operation means for determining a moving amount of a photographic lens based on the focusing adjustment information determined by said focused-state detection means for one or more focusing detection areas corresponding to one or more light measurement areas used for computing said exposure value; and control means for controlling a lens driving device based on the output from said arithmetic operation means for determining a moving amount of the photographic lens. In the case of obtaining an exposure value using effectively the results of the light measurements carried out through a plurality or all of the light measurement areas, the focused adjustment states through those areas are detected and used to compute a moving amount of the photographic lens, but in the case of obtaining a exposure value computed based principally on the output of the light measurement carried out through a predetermined single area, a moving amount of said photographic lens is obtained based on the focusing adjustment information obtained from said single area.

According to a further aspect of the invention, a camera incorporating light metering means for metering through a narrow central area or through a wide area including the central area and one or more areas adjacent the central area and focused adjustment state detection means for detecting the focusing adjustment state corresponding to the distance from said narrow area or said wide area, further comprises a light measurement mode selection means which selects the light measurement mode through the narrow area or the wide area. When the light measurement mode through the narrow area is selected, a control means computes an exposure value based on the output of the light measurement through the narrow area and a moving amount of the photographic lens is computed based on the detection signal for the narrow area delivered from said focused state adjustment detection means. On the other hand, in the case of the selection of the light measurement mode through the wide area, an exposure value is computed based on the output of the light measurement carried out through the wide area and a moving amount of the photographic lens is computed from the detection signals obtained through the wide area, thereby controlling the photographic lens driving device. Therefore, the correct focusing adjustment mode for a subject within the same area as the light measurement area can be obtained. As a result, the main subject can be sharply focused and exposed with an optimum exposure value.

The above and other objects, features and advantages of the present invention will become more apparent from the following description of some preferred embodiments thereof taken in conjunction with the accompanying drawings.

BRIEF DESCRIPTION OF THE DRAWINGS

FIG. 10 illustrates a flowchart used for the explanation of operation of the second embodiment;

FIG. 15 is a flowchart used to explain the mode of operation of the third embodiment of the present invention.

DESCRIPTION OF THE PREFERRED EMBODIMENTS

First Embodiment, FIGS. 1-5

First referring to FIGS. 1-5 of the accompanying drawings, a first preferred embodiment of the present invention will b described in detail.

Figure 1:
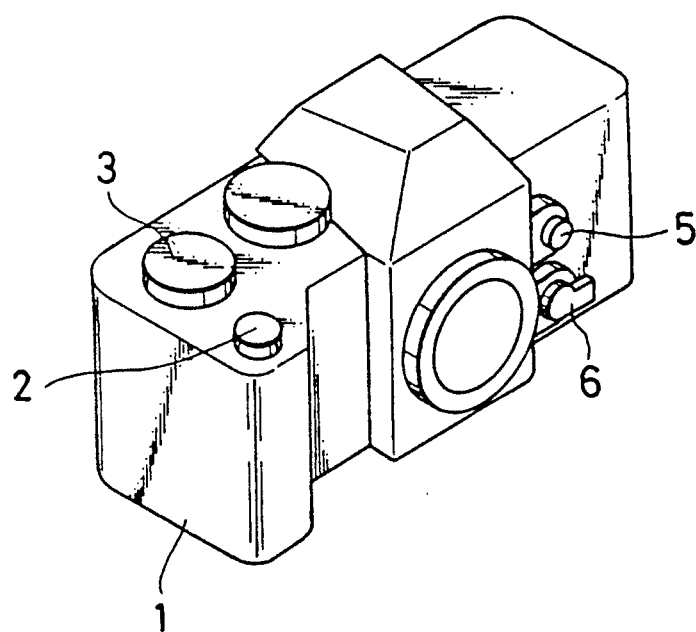
FIG. 1 is a perspective view illustrating a main body of a single-lens reflex camera incorporating a first preferred embodiment of an automatic focusing detection device in accordance with the present invention.

FIG. 1 is a perspective view illustrating an outer appearance of a single-lens reflex camera incorporating a first preferred embodiment of an automatic focusing detection device in accordance with the present invention, with a photographic lens removed.

In FIG. 1, a shutter release button 2 and an AE mode selector 3 for selecting a manual exposure control mode or an automatic exposure control mode are extended beyond the upper surface of a body 1 of a single-lens reflex camera and a photographic lens mounting or dismounting button 5 and an AF selector 6 for selecting a manual focusing mode or an automatic focusing mode are extended beyond the front side surface of the body 1.

Figure 2:
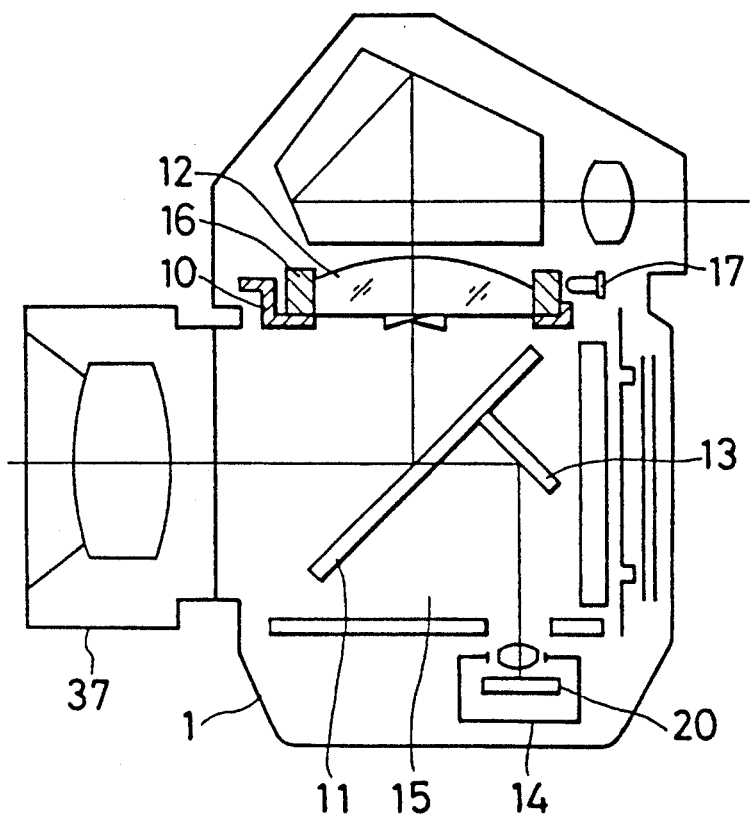
FIG. 2 is a vertical sectional view thereof illustrating schematically various mechanisms incorporated within the camera.

FIG. 2 is a diagrammatic vertical sectional view of the camera shown in FIG. 1 with a photographic lens 37 mounted.

In the camera of FIG. 2, almost all of the light flux transmitted through the photographic lens 37 is upwardly reflected by a main mirror 11 and an image of a subject is focused upon a spherical focusing screen 12 held by a focusing screen holder 10.

A portion of the light flux from lens 37 is transmitted through a semitransparent region at the center portion of the main mirror 11. This light is reflected by a sub-mirror 13 disposed behind the main mirror 11 and falls on a focusing detection module 14 disposed at the bottom of a mirror box 15.

As will be described in more detail hereinafter, in the first embodiment, a CCD array 20 consisting of three CCDs is disposed in the focusing detection module 14 so that the focusing information may be obtained from each of three focusing detection sections disposed at positions corresponding to sections of a view to be photographed.

Figure 3:
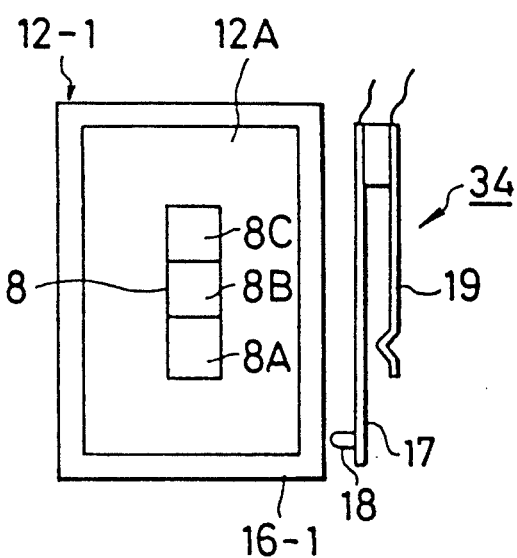
FIG. 3 is a top view of a finder screen unit equipped with a distance measurement frame indicating a plurality of focusing detection sections.
Figure 4:
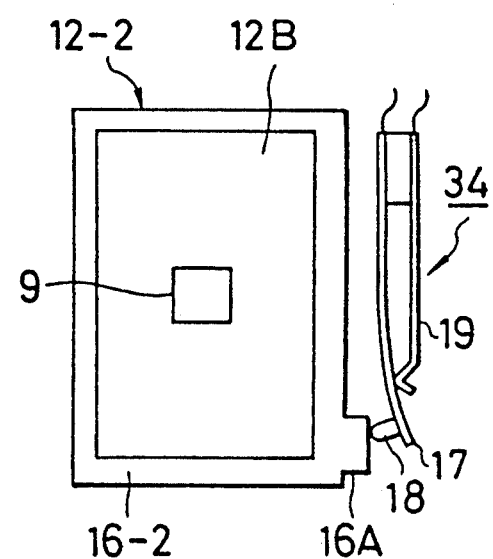
FIG. 4 is a top view illustrating the finder screen unit in which the screen supported by the distance measurement frame shown in FIG. 3 is replaced by a screen indicating only a single focusing detection section.

FIGS. 3 and 4 are views used to explain the arrangement of focusing screen 12 in the camera shown in FIG. 2.

In FIG. 3, a first focusing screen 12-1 comprises a first screen 12A provided with a subject distance frame 8 defining three focusing detection sections 8A, 8B and 8C, and a first screen supporting frame 16-1. As shown in FIG. 2, the first focusing screen 12-1 is held by the screen holder 10 of the camera body 1. In FIG. 4, a second focusing screen 12-2 comprises a second screen 12B having a subject distance measurement frame 9 which defines a single focusing detection section corresponding to the center focusing detection section 8B shown in FIG. 3, and a second screen supporting frame 16-2 which has a projection 16A extended from a portion adjacent to the lower end of one of the sides of the frame 16-2.

As shown at the right side in FIGS. 3 and 4, the camera has a switch 34 with a pair of switch contacts 17 and 19. Switch contact 17 adjacent to the side of the focusing screen has a contact pin 18 securely fixed near its lower end.

The switch contact 17 with the contact pin 18 securely fixed thereto and the contact 19 constitute a screen detection means which detects whether the first focusing screen 12-1 or the second focusing screen 12-2 is mounted. More particularly, when the first focusing screen 12-1 with the subject distance measurement frame 8 defining a plurality of focusing detection sections as shown in FIG. 3 is mounted, the switch contacts 17 and 19 are spaced apart from each other so that the switch is turned off. On the other hand, as shown in FIG. 4, when the second focusing screen 12-2 provided with the subject distance measurement frame 9 defining a single focusing detection section is mounted on the screen holder 10, projection 16A formed integral with the second screen supporting frame 16-2 presses the contact pin 18 so that the contacts 17 and 19 come in contact with each other so that the switch is turned on.

Figure 5:
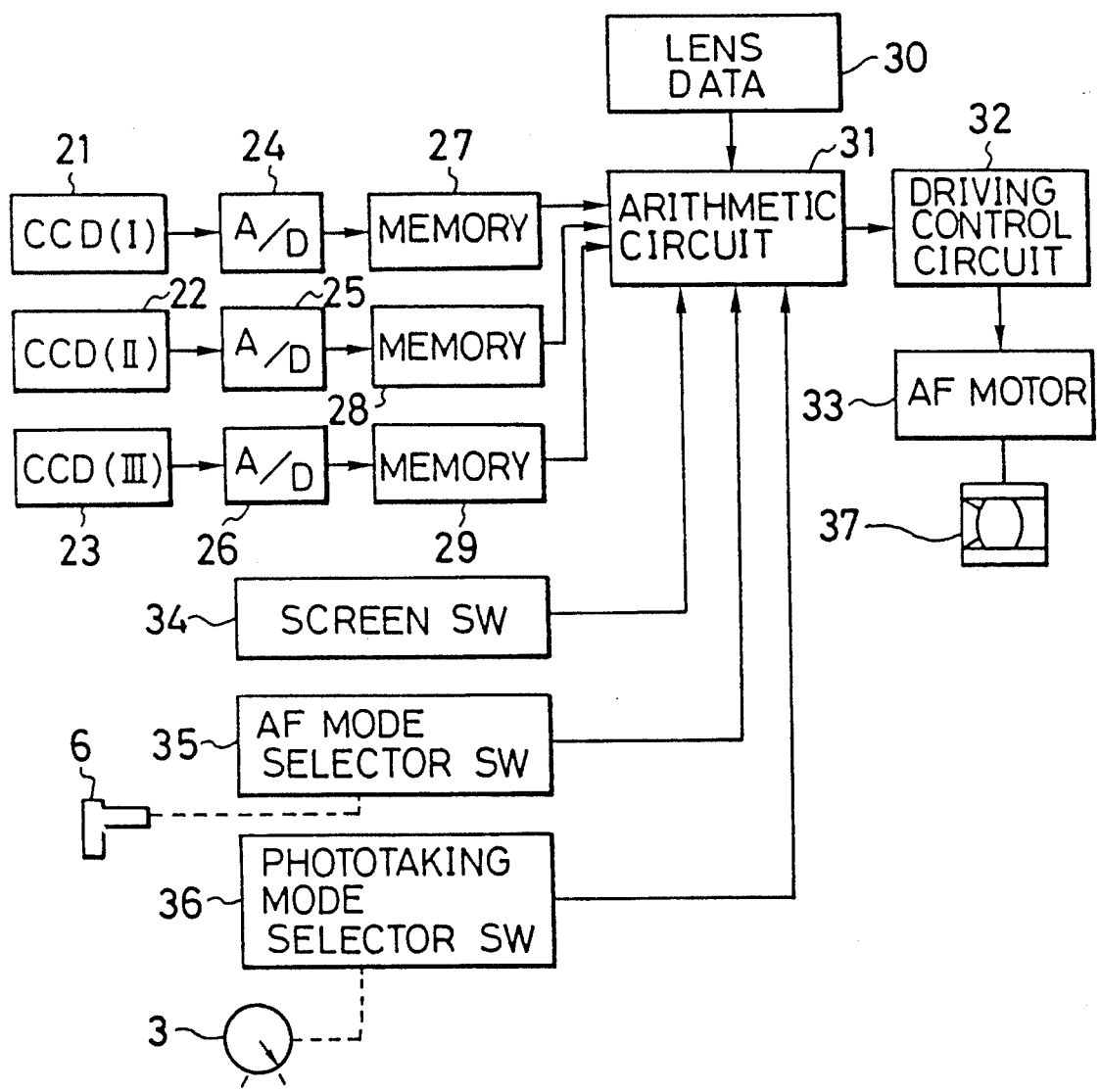
FIG. 5 illustrates a block diagram of an electric circuit of the first embodiment.

FIG. 5 is a block diagram illustrating an electric circuit of a camera incorporating the first embodiment of the present invention.

In FIG. 5, CCDs 21, 22 and 23 constitute the array of CCDs 20 within the focusing detection module shown in FIG. 2. The CCDs are arranged such that when screen 12A is used, they are in opposing relationship with the three focusing detection sections 8A, 8B and 8C, respectively, of the subject distance measurement frame 8.

A/Ds (analog to digital converters) 24, 25 and 26 convert the analog signals delivered from CCDs 21, 22 and 23, respectively, into digital signals. Storage devices 27, 28 and 29 store therein the digital signals delivered from the A/Ds 24, 25 and 26, respectively.

The data stored in the storage devices 27-29 are delivered through gate circuits (not shown) to an arithmetic circuit 31 controlled by a CPU or the like.

In accordance with each of the output signals delivered from the CCDs 21-23, the arithmetic circuit 31 determines corresponding defocus information consisting of a defocusing quantity and a defocusing direction. While the conversion into the defocusing information is carried out by the arithmetic circuit, compensation for aberrations of the focused distance, a stop, the position of the lens and so on are determined in accordance with lens data 30.

The screen switch 34 consisting of the contacts 17 and 19 and the contact pin 18 as shown in FIGS. 3 and 4, an AF mode selector switch 35 associated with the AF mode selector 6, and an exposure or phototaking mode selector switch 36 associated with the AE mode selector 3 deliver their outputs to the arithmetic circuit 31. Depending, for example, on the "ON-OFF" state of screen switch 34, arithmetic circuit 31 selects the defocusing information obtained based on the output from one of the CCDs 21-23. In accordance with the selected information, a driving control circuit 32 drives an AF motor 33 so that the optical system of the photographic lens 37 is displaced to the focused position. The focus state is displayed in accordance with the defocusing information within the view finder by a LED display or a LCD.

As noted earlier, when the second focusing screen 12-2 provided with the single subject distance measurement frame 9 as shown in FIG. 4 is mounted, the screen switch 34 is turned on. The first embodiment is so designed and constructed that in response to the "ON" state of switch 34, the arithmetic circuit 31 selects only the defocusing information obtained from a single CCD corresponding to the subject distance measurement frame 9, (for instance, the output signal derived from the CCD 22 in FIG. 5) and delivers it to the driving control circuit 32 so that the drive of the AF motor 33 is controlled.

Next the mode of operation of the first embodiment with the above-described construction will be explained, assuming initially that screen 12-1 is mounted in holder 10, whereby switch 34 is open.

As shown in FIG. 2, the light flux transmitted through the photographic lens 37 passes through a center portion of the main mirror 11, is reflected by the submirror 13 and falls on the CCD array 20 within the focusing detection module 14. As shown in FIG. 5, the CCD array 20 comprises CCDs 21, 22 and 23, and the sections for which CCDs 21-23 carry out the focusing detection correspond to the focusing detection sections 8A, 8B and 8C within the subject distance measurement frame 8 of the screen 12-1.

The outputs delivered from CCDs 21-23 are converted by the A/D converters 24-26 into digital signals, which in turn are stored in the storage devices 27-29, respectively. The signals stored in the storage devices 27-29 are delivered sequentially to the arithmetic circuit 31 through the aforementioned gate circuits (not shown).

For each signal delivered from the storage devices 27-29, the arithmetic unit determines corresponding defocusing information consisting of a defocusing quantity and the defocusing direction. Compensation for aberrations is determined in accordance with lens data 30.

When the camera is in the automatic exposure mode such as a program mode, the aperture priority exposure mode, the shutter-priority exposure mode or the like set by the AE mode selector 3, the arithmetic circuit 31 selects the defocusing information derived from the CCD detecting the closest scene (shortest subject distance) and delivers the selected defocusing information to the drive control circuit 32.

For instance, when within the subject distance measurement frame 8 of the first focusing screen, an image of a distant mountain would be focused in the, focusing detection section 8A, an automotive vehicle in the mid-distance would be focused in the focusing detection section 8B and a man/woman within a close range of view would be focused in the focusing detection section 8C (that is, when various subjects exist from a close range to a distant range), the defocusing information obtained from the view whose subject distance along the optical axis is shortest (here, section 8C) is delivered to the driving control circuit 32. Thus, the AF motor 33 is driven in such a way that the photographic lens 37 is displaced so as to sharply focus the man/woman in the focusing detection section 8C.

Next, it is assumed that the second focusing screen 12-2 as shown in FIG. 4 is mounted on the camera shown in FIG. 2. In this case projection 16 extended from the screen supporting frame 16-2 of the second focusing screen 12-2 causes the contacts 17 and 18 of the screen switch 34 to contact with each other so that an "ON" signal is delivered to the arithmetic circuit 31.

When the arithmetic circuit 31 receives the "ON" signal from the screen switch 34, it selects only the defocusing information obtained from the subject distance measurement frame 9 as shown in FIG. 4 (that is, from the output signal delivered from the CCD 22 corresponding to the central focusing detection section 8B in the subject distance measurement frame 8 shown in FIG. 3) and delivers this information together with the information concerning the position of the photographic lens to the driving control circuit 32. As a result, the AF motor 33 is driven and controlled in such a way that the subject viewed within the subject distance measurement frame 9 can be sharply focused.

As described above, according to the first embodiment of the present invention, it is automatically detected whether the first focusing screen 12-1 with the subject distance measurement frame 8 indicating a plurality of focusing detection sections 8A–8C is used, or whether the second focusing screen 12-2 with the subject distance measurement frame 9 indicating only a single focusing detection section is used. The automatic exposure control is carried out in accordance with the result of the detection, using a plurality of focusing detection sections or the single focusing detection section. Therefore, it is not necessary to provide the camera with an external operation mechanism for selecting operation based on a single or a plurality of focusing detection sections.

In the first embodiment, in accordance with the "ON-OFF" state of the screen switch 34, the arithmetic circuit 31 selects the control based on the defocusing information obtained from each of a plurality of subject distance measurement sections or the control based upon the defocusing information corresponding to the single focusing detection section. However, the automatic focusing detection device may be so designed and constructed that the control is selected in accordance with the selected switched state information of the AF mode selector switch, which selects the automatic focusing mode or the manual focusing mode and coacts with the AF mode selector 6. In this case, only the first focusing screen 12-1 is used and the screen switch 34 may be eliminated. The AF mode selector switch 35 can select any of at least three modes: the continuous AF mode, the single AF mode and the manual focusing mode.

In the case of the continuous AF mode, while the shutter release button 2 is kept depressed a half step, the photographic lens is continuously driven to the positions at which subjects are sharply focused. When the shutter release button 2 is depressed the full stroke, an exposure is made regardless of whether the subject is sharply focused or not. In the single AF mode, when the shutter release button 2 is depressed a half stroke, a focus lock is made after a subject has been sharply focused and when the shutter release button 2 is depressed to the full stroke, the shutter release can be accomplished only when the subject is sharply focused. In the case of the manual focusing mode, the automatic focusing operation is not carried out, so a subject must be sharply focused manually by rotating a focusing ring mounted on the photographic lens 37.

When the continuous AF mode or the single AF mode is selected (that is, when the automatic focusing mode is selected by the AF mode selector switch 35), the arithmetic circuit 31 drives the AF motor 33 depending upon defocusing information obtained from the CCDs 21–23, respectively. On the other hand, when the manual focusing mode is selected by the AF mode selector switch 35, the defocusing information obtained based on the output signal from CCD 22 corresponding to the focusing detection section 8B which is the central section in the subject distance measurement frame 8 is selected and the focusing state is displayed in the field of the view finder. Therefore, while observing the display, the photographer can rotate the focusing ring and sharply focus a subject.

As another alternative to using the "ON-OFF" operation of the switch 34 in response to the selection and mounting of the focusing screen 12-1 or 12-2, the "ON-OFF" information of the selector switch 36 which is associated with the AE mode selector 3 may be used. The exposure mode selector switch 36 can select the program mode, the shutter-priority mode, the aperture-priority mode and the manual mode. When automatic exposure control mode such as the program mode, the shutter-priority mode or the aperture-priority mode is selected by the exposure mode selector switch 36 (that is, by the AE mode selector 3 shown in FIG. 1), the arithmetic circuit controls the drive of AF motor 33 depending on the defocusing information obtained from each of the signals from CCDs 21–23 corresponding to the three focusing detection sections, respectively.

On the other hand, when the manual mode (the manual exposure control mode) is selected by the exposure mode selector switch 36, the defocusing information obtained from the output signal from CCD 22 corresponding to the subject distance measurement frame 9 or 8 is selected and the focused state is displayed by the display elements (not shown).

It is of course apparent that in the first embodiment, the screen switch 34, the AF mode selector switch 35 and the exposure mode selector switch 36 may be used in combination, such that the control based upon a plurality o focusing detection sections or a single focusing detection section is selected in response to a combination of "ON-OFF" information from three switches.

As described above, in the camera of the type in which a focusing plane is provided with a plurality of focusing detection sections, according to the first embodiment, it is not necessary to install an operation mechanism exclusively used for measuring the distance from the photographic camera to the center of a subject in a spot-like manner. For example, by selecting the first focusing screen equipped with the subject distance measurement frame indicating a plurality of focusing detection sections or the second focusing screen equipped with the subject distance measurement frame indicating a single focusing detection section, the appropriate subject distance measurement can be automatically accomplished. As a result, an operating mechanism need not be attached to the outer side of the camera. Thus, the cost is inexpensive and operations of other operation mechanisms are not adversely affected.

In addition, by the AF mode selector for selecting the automatic focusing mode and the manual focusing mode or by the exposure mode selector for selecting an automatic exposure mode (such as the programmed mode, the aperture-priority mode and the shutter-priority mode) or the manual exposure control mode, the control based upon a plurality of focusing detection sections or a single focusing detection section can be selected. As in the case of the selection of the first focusing screen or the second focusing screen, it is not necessary to install any additional exterior operation mechanisms, so that the cost is inexpensive and the operations of other operation mechanisms are not adversely affected.

Especially in the case of the AF or AE mode selection, in the manual mode, a single focusing detection section such as the central focusing detection section is selected. In the case of the manual mode, in many cases the photographer carefully exposes the subjects. It is preferable that the subject distance measurement is carried out at a central narrow portion so that the photographer is not troubled by the fact that he/she is not sure as to which subject the subject distance measurement is made.

The first embodiment described above is so designed and constructed that the focusing point detection in a single section or a plurality of sections can be carried out in accordance with the mode set by the automatic manual mode selection means or by the replacement of the focusing screen mounted on the camera.

Referring now to FIGS. 6-10, a second embodiment of the invention will be described, wherein by selecting the suitable relationship between the subject distance measurements and light metering in a plurality of sections, a subject which a photographer intends to photograph can be suitably exposed and focused.

Second Embodiment, FIGS. 6-10

Figure 6:
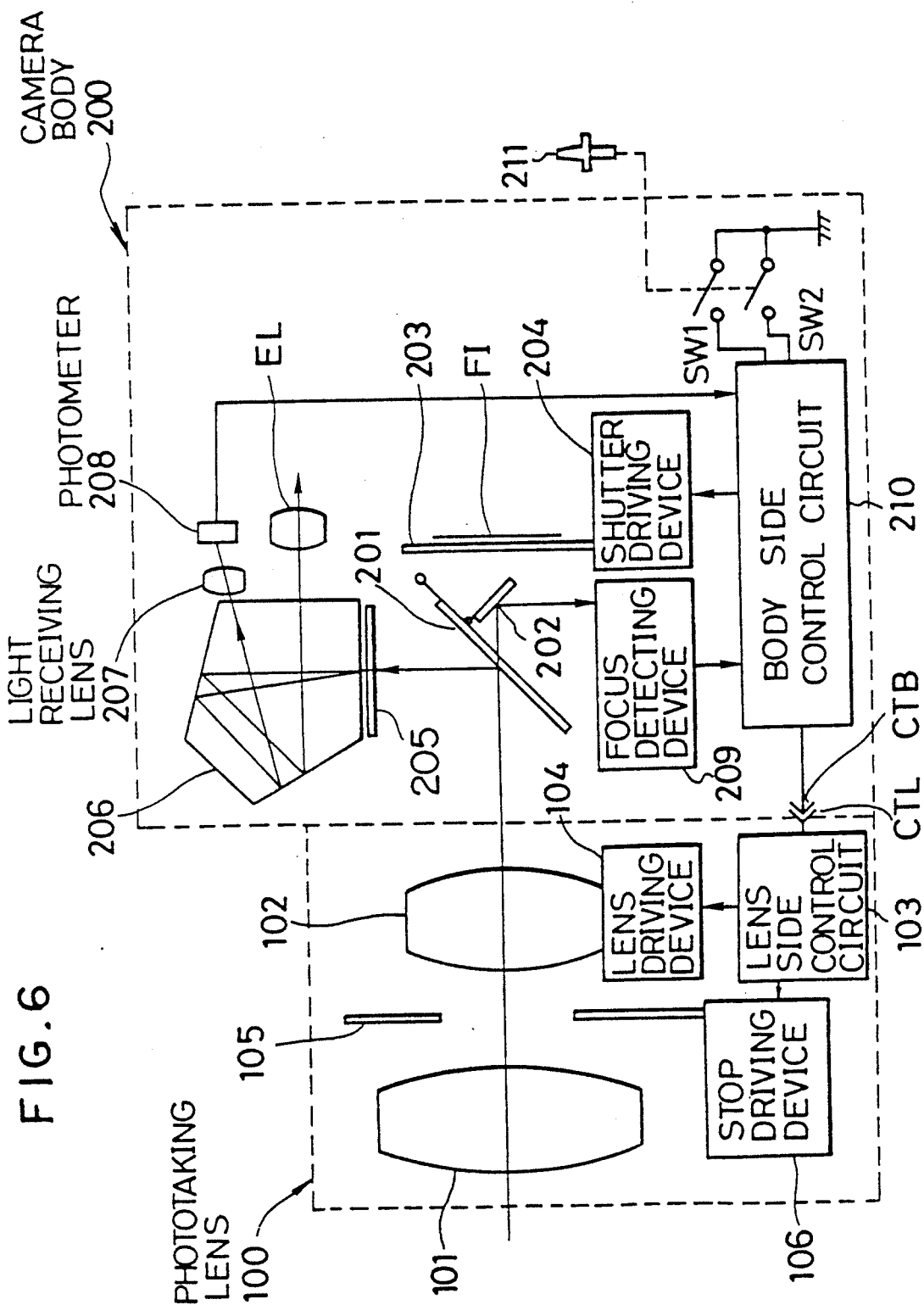
FIG. 6 is a block diagram illustrating the construction of a single-lens reflex camera incorporating a second embodiment of an automatic focusing detection device in accordance with the present invention.

FIG. 6 illustrates the construction of a single-lens reflex camera of the type capable of exchanging photographic lenses. In FIG. 6, a phototaking lens 100 is detachably mounted on a camera body 200 by means of a bayonet mount (not shown). The optical system of the phototaking lens 100 comprises a first lens group 101 and a second lens group 102. The focusing operation is carried out by displacing the second lens group 102 in the direction of the optical axis by a lens driving device 104 which in turn is controlled by a lens-side control circuit 103. Between the first and second lens groups 101 and 102 is interposed a variable stop or aperture 105. The setting of a desired stop is carried out by a stop or aperture driving (control) device 106 which in turn is controlled by the lens-side control circuit 103. Connector contacts CTL and CTB are arranged at the mount so that the data exchange may be permitted between the lens-side control circuit 103 and a body-side control circuit 210 to be described in more detail hereinafter.

Within the camera body are disposed a main mirror 201 which reflects a part of the light flux transmitted through the phototaking lens 100 upwardly and which also allows a part of the light flux to transmit therethrough, and a sub-mirror 202 for reflecting downwardly the light flux transmitted through the main mirror 201. Behind the sub-mirror 202 are disposed a focal plane shutter 203 and a film FI. At the time of an exposure, the main mirror 201 and the sub-mirror 202 are retracted from the exposure light path so that they will not interfere with the image light flux. The focal plane shutter 203 is opened and closed by a shutter driving circuit 204 so as to control the exposure of the film FI.

When the mirrors are in their non-retracted state, the light flux reflected upwardly by the main mirror 210 falls on a focal plane 205 disposed in conjugate relationship with the surface of the film FI. The image focused on the focal plane can be viewed through a pentaprism 206 and an eye piece EL.

The light flux diffused or scattered upon the surface of the focal plane 205 is transmitted through the pentaprism 206 and is focused again on the light receiving surface of a photometer 208 through a light receiving lens 207 s that the brightness of the subject can be measured. The photometer 208 functions in such a way that an output from each of the sections defined by dividing the image field may be derived. Therefore the photometer 208 is referred to as "the photometer 208 with a plurality of light incident areas" hereinafter in this specification. The light flux reflected downwardly by the sub-mirror 202 falls on a focus detection device 209 so that the focusing state of the image on the surface of the film FL (that is, a degree of focusing) is detected.

The output from the photometer 208 with a plurality of light incident areas and the output from the focusing detection device 209 are delivered to a body-side control circuit 210, which also receives the "ON-OFF" signals from a power supply switch SW1 and a release switch SW2. The body-side control circuit 210 delivers a control signal through the contacts CTB and CTL to the lens-side control circuit 103 and furthermore applies various control signals to a shutter driving device 204 and a film winding device (not shown) incorporated in the camera body 200.

The power switch SW1 is a switch for a power supply for the camera and effects a self-holding, for instance, for eight seconds under the control of a timer function of the body-side control circuit 210. The release switch SW2 is turned on only when the power supply switch SW1 remains in the "ON" state and enables a series of operations regarding the exposure by the camera. The power supply switch SW1 and the release switch SW2 are turned on when a release button 211 is depressed a half stroke and a full stroke, respectively.

Figure 7A:
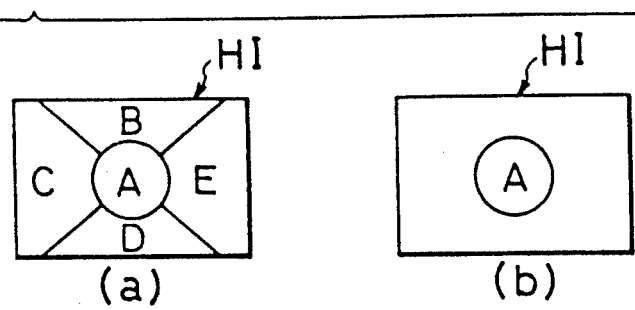
FIG. 7A, FIG. 8A and FIG. 9A are views used to explain some examples of the division of the image field into light metering sections in the second embodiment.
Figure 7B:
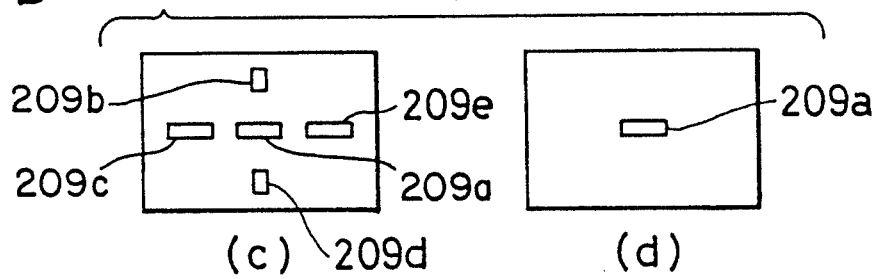
FIGS. 7B, 8B and 9B are views used to explain some examples of the division of the image field into sections whose subject distances must be measured.

Referring next to FIGS. 7A and 7B, the photometer 208 with a plurality of light incident areas and the focus detection device 209 will be described.

The photometer 208 with a plurality of light incident areas receives the light of the image focused on the focal plane 205 through the pentaprism 206 and the light receiving lens 207. For instance, as shown in FIG. 7A(a), the photometer 208 with a plurality of light incident areas may be divided into five areas corresponding to areas A-E, respectively, so that the light measurements of the areas A-E obtained by dividing the image field HI can be carried out. In the second embodiment, the exposure value is determined by the multi-light-measuring system based upon the measured values obtained from the central area A and the peripheral areas B-E.

The multi-light-measuring system is such that an image field is divided into a plurality of areas whose brightness is measured so that a plurality of light measurement outputs corresponding to the areas is obtained. The brightness distribution state of the image field is evaluated based on the respective light measurement outputs, and a light measurement output having a high degree of probability of attaining an optimum exposure in the brightness distribution state is obtained. For example, an exposure value can be obtained by the following light measurement systems:

(1) the weighted center-light-output system in which the light measurement output obtained from the central area A is considerably weighted as compared with the light measurement outputs obtained from the peripheral areas, whereby an exposure value is obtained, (2) the average light measurement system in which one or more high brightness areas in excess of, for instance, +16 EV are cut off and the exposure value is obtained by the average value of the outputs from the remaining areas, and (3) the system in which the exposure value is obtained by considerably weighting the light measurement output of at least one low brightness area.

In the focus detection device 209 a focusing detection optical system divides the light flux transmitted from the sub-mirror 202 and forms a pair of light images on a focusing detection photometer. In response to the output from the photometer, the image focus condition is detected. In general, a phase-difference detection type line sensor is used in the photometer. In the second embodiment, as shown in FIG. 7B(c), the above-mentioned photometer 208 with a plurality of light incident areas is divided into areas A-E and line sensors 209a-209e are disposed to carry out the focusing detection for the respective divided areas A-E.

In the case of the aforementioned system (1), the center weighted light measurement system, the displacement of the phototaking lens is computed from the output of line sensor 209a corresponding to the center area A as shown in FIGS. 7A(a) and 7B(d). In the case of the system (3) in which dim light is weighted, the displacement of the photographic lens is computed using the output from the line sensor or sensors corresponding to one or more selected dim areas (for instance, line sensor 209d corresponding to area D). In the case of the system (2) in which the average light measurement is carried out with one or more high brightness areas excluded, the displacement of the photographic lens is computed using the outputs from the line sensors corresponding to the selected dim area or areas (for instance, sensors 209a, 209c, 209d, and 209e corresponding to the A, C, D and E areas, with area B excluded).

In the case of the system (1) in which the intensity of light passing through the center of the photographic lens is weighted and also in the case of the system (3) in which dim light is weighted, the arithmetic operation for obtaining an exposure value is carried out based on the light measurement outputs from all the areas. However, the exposure value thus obtained is principally dependent upon the light measurement output from the central area or the light measurement output from one or more dim areas. As a result, only the central area or one or more dim areas are selected as a corresponding focusing detection area. In the case of the second system (2), instead of cutting off one or more bright areas in excess of +16 EV, a lesser value may be substituted for such areas or, in the case of a weighting system, the outputs from such areas may be weighted less. The exposure value obtained is almost unaffected by the bright area. Therefore, the displacement of the photographic lens may be computed using the light measurement outputs from the areas which are not cut off. The expression "the area used for the arithmetic operation for obtaining an exposure value" used in this specification refers to the central area in the system (1) in which light passing through the center of the photographic lens is weighted, to one or more dim areas in the system (3) in which dim light is weighted, and to one or more areas, for instance, less than +16 EV in the system (2) in which an arithmetic mean is obtained from a plurality of outputs.

FIGS. 8A and 8B and FIGS. 9A and 9B correspond to FIG. 7A and FIG. 7B, respectively, and illustrate some modifications of the photometer 208 with a plurality of light receiving areas and the elements for measuring the subject distance.

(1) Light Metering Area

In the light metering area of FIG. 7A(a), the boundary lines are extended at inclined angles toward the circular central area A, thereby defining the peripheral areas B-D. But in the cases of FIGS. 8A(a) and 9A(a), the boundary lines are extended inwardly from the midpoints of the vertical and horizontal sides toward the circular central area A, thereby defining upper and lower regions each consisting of two light measurement areas.

(2) Subject Distance Measurement Areas

In the case of the subject distance measurement element shown in FIG. 7B(c) for measuring a plurality of subject distances of a plurality subjects, the line sensors 209a-209e correspond to the light metering areas A-E, respectively, but it is not necessary to establish a one-to-one relationship between the light metering areas and the subject distance measurement areas. For instance, as shown in FIG. 8B(c), the line sensors 219 and 220 are disposed in the form of a cross, and as shown in FIG. 9B(c), line sensors 221, 222 and 223 are arranged in the form of a letter H.

Figure 8A:
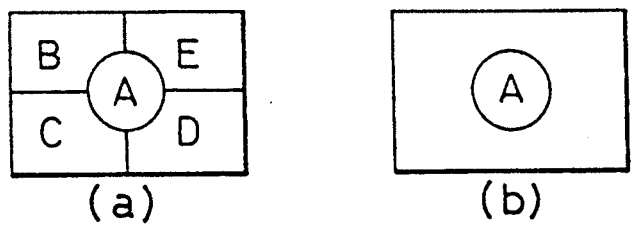
Figure 8B:
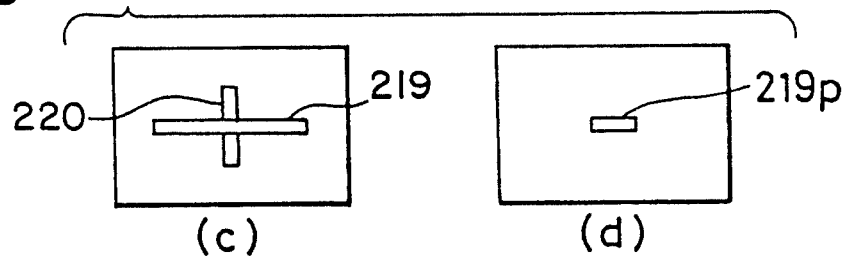

Whereas in the case of the subject distance measurement for the central area A in FIG. 7A(b) corresponding to that of FIG. 7A(a), the signal is obtained from all the array of elements of the short line sensor 209a disposed at the center portion, the system shown in FIG. 8B, for example, uses the signals from some of the central elements of the array of elements of the elongated line sensor 219. Thus, the focusing detection area becomes the area 219p in FIG. 8B(d).

Also, when the light metering areas B and C shown in FIG. 8A(a) are selected, for example, the focusing detection is carried out based on the light metering data from the pixels of line sensor 219 disposed on the boundary line between the areas B and C.

Figure 9A:
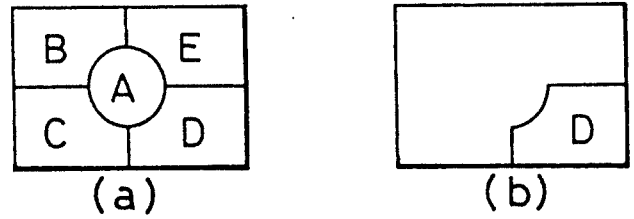
Figure 9B:
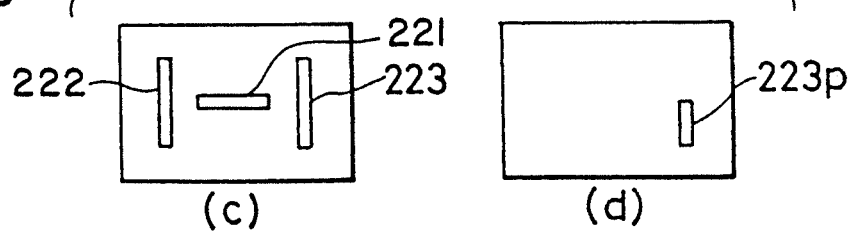

Referring to FIGS. 9A(b) and 9B(d), it will be appreciated that when the area D is selected, for example, in FIGS. 9A(b) and 9B(d), when the area D is selected, the line sensor 223 is used in such a way that the displacement of the photographic lens is computed based upon the focusing adjustment information obtained from the pixels 223p in opposing relationship with the area D.

Next the mode of operation of the camera with the above-described construction will be explained in detail with reference to the flowchart shown in FIG. 10.

First the release button 211 is depressed a half stroke so that the power supply switch SW1 is actuated and turned on (step S1) and consequently the power supply is supplied to the camera (step S2). In the succeeding step S3, the light metering is carried out and the light metering outputs from the areas A-E of the photometer 208 with a plurality of light receiving areas are delivered to the body-side control circuit 210 (step S3). Next it is detected whether one or more light metering areas is to be used for the arithmetic operation for light metering (step S4). For purposes of this test, in the case of the light metering in which light passing through the center of the photographic lens is weighted and in the case where dim light from one section is weighted, the number of light metering areas is defined as one (since the light metering is based principally on one area), but in the case of the arithmetic means light metering in which the highly bright light is cut off, the light metering areas are plural (more). In the case of a plurality of areas, the routine advances to the step S5, but in the case of the single area, the routine proceeds to the step S6. Based on each of the light metering outputs, a shutter speed and an aperture are computed by a predetermined multi-light-measurement algorithm and in the step S7 the data thus obtained is displayed by an LCD (not shown) incorporated in a viewfinder. Next the state of the release switch SW2 is checked (step S8) to determined if the release switch button 211 is depressed to the full stroke. When the switch SW2 is turned on, the routine proceeds to the step S9, but when it is turned off, the routine proceeds to the step S17. In the step S9, as in the case of the step S3 described above, the light metering of all of the areas is carried out. In the succeeding step S10 whether the light metering system uses a plurality of areas or a single area is detected in a manner substantially similar to that described above for step S4. When the light metering system using a plurality of areas is detected, the arithmetic operation for obtaining an exposure value is carried out in the step S11, and when the light metering system using only a single area is detected, the arithmetic operation for obtaining an exposure value is carried in the step S13. Thus a shutter speed and an aperture or stop are determined.

Next in the case of a plurality of light metering areas, the displacement of the photographic lens is determined in the step S12 using the focusing adjustment information obtained from a plurality of subject distance measurement areas corresponding to a plurality of light metering areas, respectively. In the case of a single area, in the step S14 the displacement is determined using the focusing adjustment information obtained from a single subject distance measurement area corresponding to a single light metering area.

The arithmetic operation using the focusing adjustment information obtained from a plurality of the subject distance measurement areas causes the focus detection device to detect the focusing state of each of line sensors of a plurality of areas. Based upon the subject distance measurement results, the body-side control circuit 210 selects, for instance, the closest distance from a plurality of subject distance measurement results. For instance, based on the defocusing quantity (which is used to define the distance between a predetermined focused surface and a surface upon which an image is actually focused) and the position of the second lens group 102, the line sensor which is detecting the closest subject is determined and the focusing detection data from this line sensor is transmitted through the contacts CTB and CTL to the lens-side control circuit 103. In accordance with this focusing detection data, the lens-side control circuit 103 controls the lens driving device 104 so as to carry out the focusing operation. The focusing operation is repeated as many as needed until the subject is sharply focused. By contrast, when the single area is detected, the focusing adjustment is carried out in accordance with the subject distance measurement data from a line sensor in opposing relationship with a selected light metering area in a manner substantially similar to that described above.

In the step S15, the main mirror 201 and the submirror 202 are retracted from the exposure light path and the lens-side control circuit 103 and the aperture or stop driving device 106 set an aperture or stop and the shutter 203 is actuated to expose the film FI. After a predetermined time interval, the shutter 203 is closed and the variable aperture or stop 105 is opened wide. The main mirror 201 and the sub-mirror 202 are returned to the positions shown in FIG. 6. Thus the exposure is accomplished.

In the next step S16, the film is advanced by a film winding device (not shown) while the shutter is charged by a shutter charging device (not shown). Thereafter the routine advances to the step S17 in which the state of the switch SW1 is checked. When it is detected that the switch SW1 is actuated, the steps from S2 to S16 are repeated in the manner earlier described. When the switch SW1 is released, the power supply switch SW1 is self-held for a time interval of, for instance, eight seconds and a loop consisting of the step S17 and the step S18 is repeated. After eight seconds, the timer is turned off, whereby the self-holding is released and in the step S19 the power supply is turned off, whereby the operation of the focus detection device is terminated (the step S20).

According to the second embodiment of the present invention, light metering values are obtained from a plurality of areas defined by dividing the image field, the arithmetic operation for obtaining an exposure value is carried out based principally on the value from a selected area or areas, focusing adjustment information is obtained from the focus detection area or areas corresponding to the selected light measurement area or areas, and the arithmetic operation for obtaining the displacement of the photographic lens based on focus adjusting information from a selected one such focus detection area having a high probability of containing the main subject is carried out. As a result, the main subject can be sharply focused and exposed by an optimum exposure value.

Third Embodiment, FIGS. 11-15

Next referring to FIGS. 11-15, a third embodiment of the present invention capable of photographing an intended main subject at a suitable exposure value and a desired state of the focused image of the main subject will be described.

Figure 11:
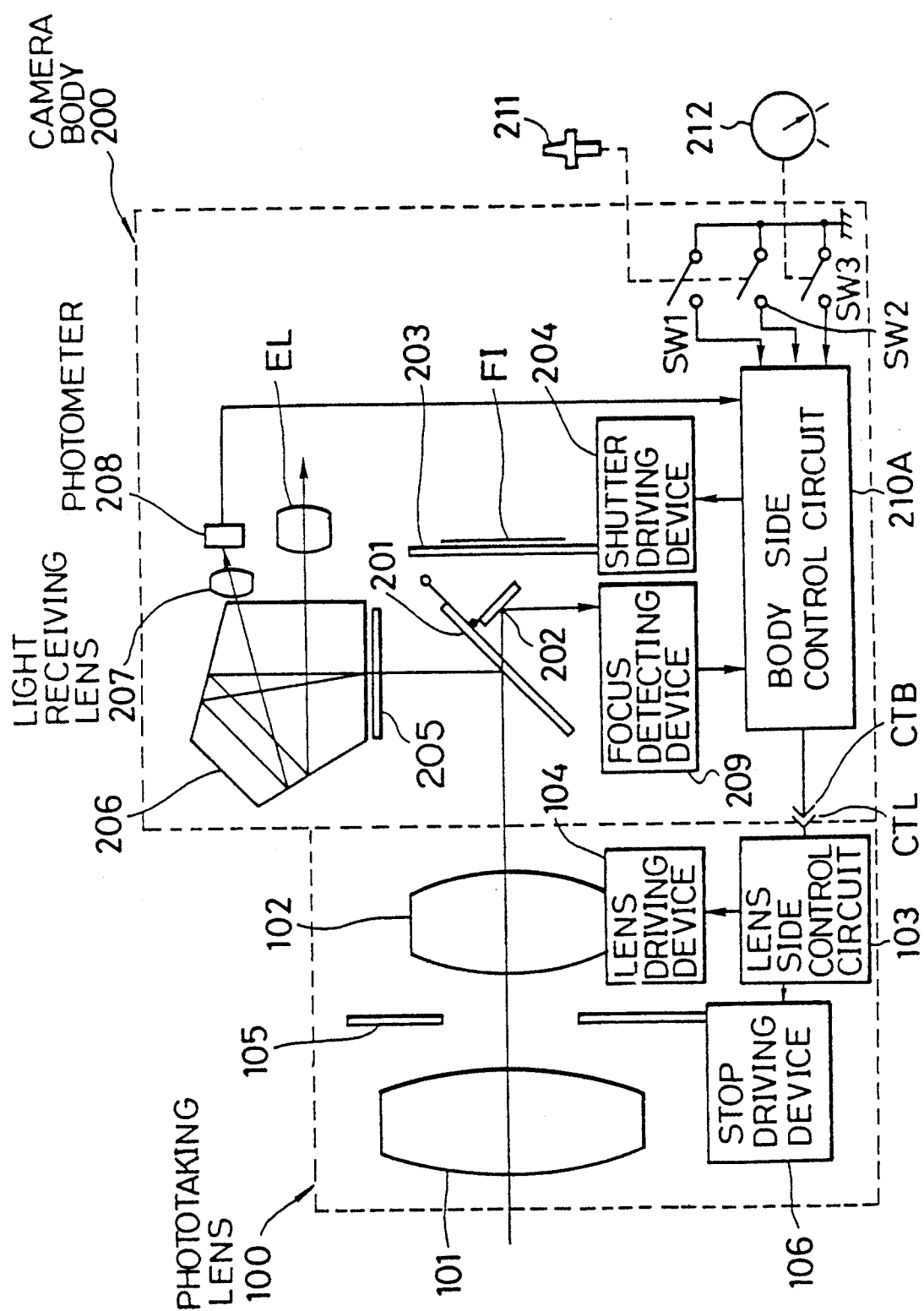
FIG. 11 is a block diagram illustrating the construction of a single lens reflex camera incorporating a third embodiment of an automatic focusing detection device in accordance with the present invention.

FIG. 11 is a schematic view illustrating the construction of an interchangeable lens type single-lens reflex camera incorporating a third embodiment of the present invention. The third embodiment is substantially similar in construction to the second embodiment shown in FIG. 6 except the additional provision of a mode setting switch SW3 adapted to coact with the mode setting dial 212. Therefore, the same reference numerals are used to designate similar parts in FIGS. 6 and 11 and those component parts which have been already described in connection with the second embodiment will not be further described in connection with the third embodiment.

Now referring to FIG. 11, the output signals from the photometer 208 with a plurality of light receiving areas and the focus detection device 209 are delivered to the body-side control circuit 210A, which also receives the "ON-OFF" states of the power supply switch SW1, the release switch SW2 and the mode setting switch SW3 described above. The body-side control circuit 210A delivers the control signals to the lens-side control circuit 103 through the contacts CTB and CTL at the mount and also applies various control signals to the shutter driving device 204 and the film winding device (not shown) disposed within the camera body 200.

The self-locked state of the power supply switch SW1 continues, for instance, for eight seconds under the control of the timer (not shown) incorporated in the body-side control circuit 210A. The release switch SW2 can be turned on only when the power supply switch SW1 is in "ON" state and enables the starting of a series of operations associated with each exposure. The power supply switch SW1 and the release switch SW2 are turned on when the release button 211 is depressed a half stroke and a full stroke, respectively. The function of the mode setting switch SW3 is the selection of the light metering mode and the subject distance measurement mode. When the switch SW3 is turned on, a wide area mode is selected, but when the switch SW3 is turned off, a narrow area mode is selected. It must be pointed out here that the mode setting switch SW3 coacts with the mode setting dial 212 and is operated from the exterior.

Figure 12A:
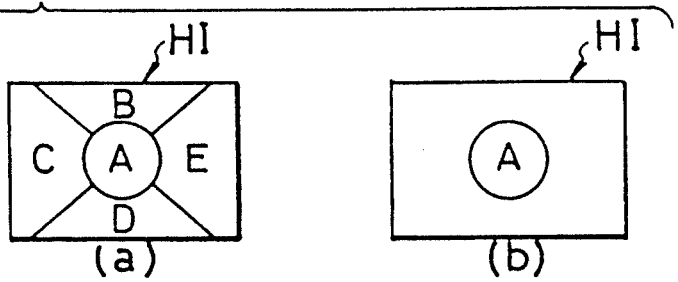
FIG. 12A, FIG. 13A and FIG. 14A are views used to explain some examples of the division of the image field into light metering sections in the third embodiment.
Figure 12B:
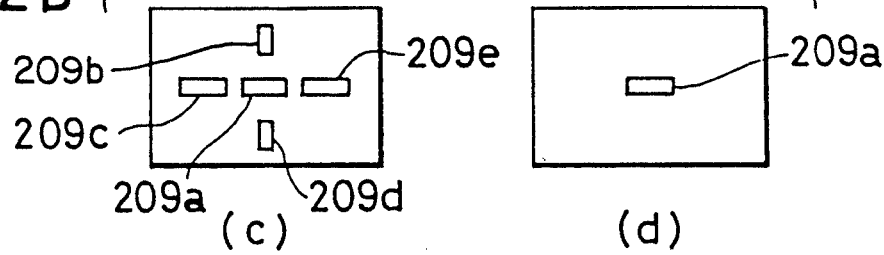
FIG. 12B, FIG. 13B and FIG. 14B are views used for the explanation of some examples of the division of the image field into sections whose subject distances may be measured in the third embodiment.

Referring next to FIGS. 12A and 12B, the photometer with a plurality of light receiving areas and the focus detection device 209 will be described.

The photometer 208 with a plurality of light receiving areas receives the image focused on the focusing plate 205 through the pentaprism 206 and the light receiving lens 207 and is capable of accomplishing the light metering from five areas A-E defined by dividing the image plane HI as shown in FIG. 12A(a). Of the five divided areas A-E, the area A is called the central area. According to the third embodiment, the light metering through the central area A (that is, through a narrow area as shown in FIG. 12A(b)) or the multi-light-measurement through the central area A and the peripheral areas B-E (that is, the multi-light-measurement through a wide area as shown in FIG. 12A(a)) can be selected.

The focus detection device 209 is such that the light flux redirected by the sub-mirror 202 is divided by a focusing detection optical system (not shown) and is focused as a pair of light images on the focusing detection photocell, and in response to the detected signal derived from the photocell the focusing adjustment state is detected. In general, a phase difference detection type line sensor is used as the photocell. Also in the third embodiment, as shown in FIG. 12B(c), focusing detection line sensors 209a-209e are disposed in opposing relationship with the divided sections A-E of the photometer 208 with a plurality of light receiving areas. As in the case of the light metering mode, the area at the center portion is called the central area while the portions adjacent to the central area are called peripheral areas. According to the third embodiment, the central subject distance measurement system for adjusting focusing in accordance with the data derived from the line sensor 209a which detects the focus state of an image in a picture plane through the central area (the narrow area) may be selected. Also, the multi-subject-distance-measurement system in which data is obtained from the line sensors 209a-209e which detect the focus state of an image on a picture plane through not only the central area but also peripheral areas, and in which focusing is conducted based on the data representative of the shortest subject distance may be selected.

As described above, in the cases of the light metering and the subject distance measurement, when the mode setting switch SW3 is turned on, the combination of the multi-light-measurement system and the multi-subject-distance-measurement system can be obtained, but when the mode setting switch SW3 is turned off, the combination of the light metering system through the central area and the subject-distance-measurement system through the central area can be obtained.

FIGS. 13A and 13B and FIGS. 14A and 14B correspond to FIGS. 12A and 12B, respectively, and illustrate some modifications of the light metering element 208 and the subject distance measurement photocells.

(1) Light Metering Area

Figure 14A:
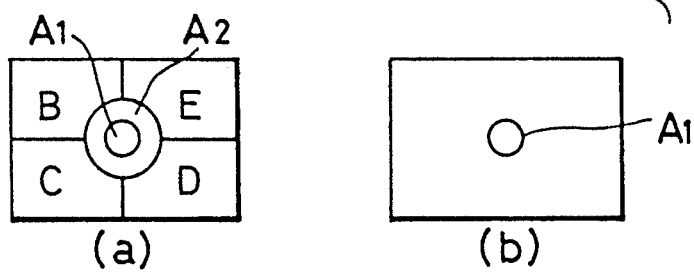

In FIG. 12A(a), as in the case of FIG. 7A(a), the inclined lines are extended from the sides of the picture plane HI inwardly to the central area A so that the peripheral areas B-E are defined at the upper, lower, right and left portions around the central area A. As, in the cases of FIGS. 8A(a) and FIG. 9A(a), in the cases of FIGS. 13A(a) and 14A(a) the boundary lines are extended from the midpoints of the sides horizontally and vertically toward the central area A so that two upper peripheral areas B and E and two lower peripheral areas C and D are defined. The two peripheral areas B and C are vertically adjacent, as are the two peripheral areas D and E. The central light metering through the central area A can be made through a relatively wide area as shown in FIG. 12A(b) or FIG. 13A(b). Alternatively, as shown in FIG. 14A(a), the central area A is divided into coaxial central areas A1 and A2 and spot light metering can be carried out through a relatively narrow central area A1.

(2) Subject Distance Areas

Figure 13A:
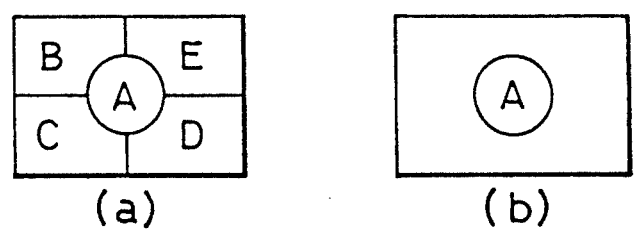
Figure 13B:
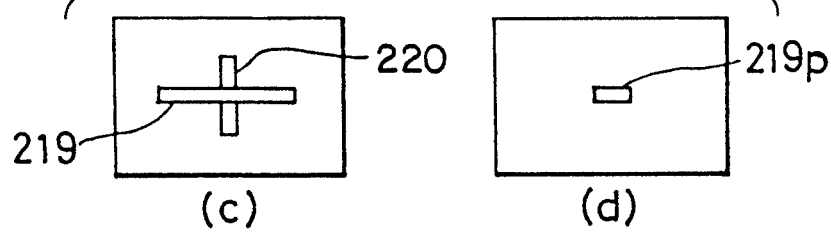
Figure 14B:
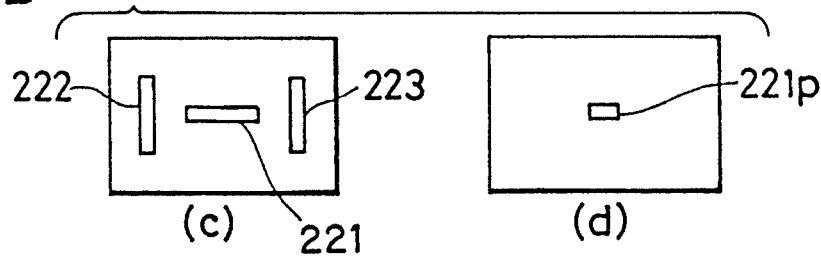

As in the case of FIG. 7B(c), in the case of the multi-subject-distance measurement element shown in FIG. 12B(c), the line sensors 209a-209e are arranged respectively in opposing relationship with the light metering areas A-E, but it is not necessary to establish exact one-to-one correspondence among them. For instance, as shown in FIG. 13B(c), the line sensors 219 and 220 are arranged in the form of a cross, or as shown in FIG. 14B(c), line sensors 221, 222 and 223 are arranged in the form of a letter H.

In the case of the subject distance measurement, as in the case of FIG. 7B(d), the system which uses a signal from each of the elements of a short line sensor 209a arranged at the center of the image plane may be employed. Alternatively, as shown in FIG. 13B and FIG. 14B, a system in which the signals obtained from the center portion of an elongated line sensor 219 or 221 may be used. Thus, the focusing detection area is the area 219p or 221p as shown in FIG. 13B(d) and FIG. 14B(d).

Referring next to FIG. 15 illustrating the flowchart, the mode of operation of the multi-light-measurement device with the above-mentioned construction will be described.

(1) When the mode setting switch SW3 is turned on

It is assumed that the multi-light-measurement mode is selected by the mode setting dial 212 so that the mode setting switch SW3 is turned on. First when the release button 211 is depressed a half stroke (the step S101), the power supply is turned on (the step S102) and the state of the mode setting switch SW3 is detected. When the mode setting switch SW3 is turned on, the multi-subject-distance-measurement mode and the multi-light-measurement mode are selected (the steps S104 and S105). Thereafter in the step S108, the respective output signals of the light metering from the areas A-E of the photometer 208 with a plurality of light incident areas are delivered to the body-side control circuit 210A, so that based on a predetermined multi-light-measurementmode algorithm, a shutter speed and an aperture or stop are determined and displayed on the image plane of a view finder by, for instance, an LCD (not shown). Next the state of the switch SW2 is detected in the step S109 and when the switch SW2 is turned on, the routine proceeds to the step S110, but when it is turned off, the routine advances to the step S113.

When the release switch SW2 is turned on, a series of exposure controls are accomplished in the steps from S110 to S112. In the first step S110, the focus detection device 209 detects the focusing adjustment state of each of a plurality of line sensors 209a-209e in a plurality of areas. Based on the detected data thus obtained, the body-side control circuit 210A selects the closest subject distance from a plurality of subject distance data. For instance, based on the defocusing quantity (the distance between a preselected image plane and an image plane upon which is actually focused an image) and the position of the second lens group 102, the line sensor whose output data represents the shortest subject distance is selected. This data is delivered to the lens-side control circuit 103 through the contacts CTB and CTL. In accordance with the data thus delivered, the lens-side control circuit 103 controls the lens driving device 104 to carry out the focusing operation, which is repeated until the subject is sharply focused on the image plane.

Next in the step S111, the respective outputs from a plurality of areas A-E of the photometer 208 with a plurality of light incidence areas are delivered to the body-side control circuit 210A again, and based on a predetermined multi-light-measurement-mode algorithm a shutter speed and an aperture or stop are computed. The main mirror 201 and the sub-mirror 202 are retracted out of the path for image focusing light rays and an aperture or stop of the photographic lens is set by the lens-side control circuit 103 and the aperture or stop driving device 106. Then the shutter 203 is opened for exposure. After a predetermined time, the shutter 203 is closed and the aperture or stop is opened wide. The main mirror 201 and the sub-mirror 202 are returned to their initial positions shown in FIG. 11. Thus, one exposure is accomplished.

Thereafter in the step S112, the film is advanced by the film winding device while the shutter is charged again by the shutter charging device (not shown). When the series of exposure operations are accomplished, the routine advances to the step S113 in which the state of the power supply switch SW1 is detected. When the power supply switch SW1 is actuated, the series of the steps from S102 to S112 are repeated, but when it is released, in the step S114 the operation of the timer is carried out and the switch SW1 is self-held for eight seconds so that the loop consisting of the step S113 and step S114 is repeated. After eight seconds, the self-holding mode is released so that in the step S115 the power supply is turned off. Thus the operations are terminated (the step S116).

(2) When the mode setting switch SW3 is turned off

When the mode setting dial 212 selects the light metering mode through the central area, the mode setting switch SW3 is turned off. After executing the steps S106 and S107, the routine advances to the step S108. In the case of the light metering, the arithmetic operation for obtaining an exposure value is carried out only based upon the central area A and a shutter speed and an aperture or stop are displayed. In accordance with the exposure data thus displayed, the exposure is made. In the case of the single subject distance measurement mode, based upon the data obtained from line sensor 209a corresponding to the central area A and upon the current position of the photographic lens, the arithmetic operation for obtaining a displacement of the photographic lens is carried out and the photographic lens is moved by the displacement thus computed.

For the case of the light metering and the subject distance measurement through the central light incident or receiving area, the camera may be designed such that the brightness and the subject distance at the central area of the image field are memorized when the release button 211 is depressed a half stroke or at the time at which the power supply switch SW1 is turned on, and a so-called AE lock and a focus lock are effected. As a result, various framing operations may be carried out so that an optimum framing reflecting the intention of the photographer can be obtained.

In the third embodiment according to the intention of the photographer, the main subject can be focused in a narrow area or a wide area, through which the light metering is carried out. Furthermore, the focusing adjustment of the subject in the same area used for the light metering is detected so that the main subject can be sharply focused and exposed with an optimum shutter speed and an optimum aperture or stop.

In the second and third embodiments, the photometer 208 with a plurality of light incident or receiving areas and the photocells 209a-209e for the measurement of the subject distance are arranged independently, but the light metering and the substance distance measurement can be carried out by the same element. In addition, it has been described that the focusing adjustment is carried out by the phase difference detection system, but the active subject distance measurement system may be used. Moreover, the present invention may be equally applied to lens-shutter cameras and electronic still cameras.

What is claimed is:

1. An automatic focusing detection apparatus for a camera of type having lens driving means for automatically moving a photographic lens to a position at which a subject is sharply focused, comprising:

focused-state detection means for detecting whether said subject is in focus or out of focus in each of a plurality of focusing detection areas defined by dividing an image field, and for providing a corresponding plurality of focus detection signals;

a first focusing screen which has a plurality of subject distance measurement frames defining said plurality of focusing detection areas and which is detachably mountable on said camera;

a second focusing screen which has a subject distance measurement frame defining a single focusing detection area corresponding to one of said plurality of focusing detection areas, and which is interchangeable with said first focusing screen;

screen detection means for detecting whether said first or second focusing screen is mounted on said camera; and control means responsive to said screen detection means for controlling said lens driving means based on the focus detection signals corresponding to said plurality of focusing detection areas when said screen detection means detects said first focusing screen, and for controlling lens driving means based on the focus detection signal corresponding to said single focusing detection area when said screen detection means detects said second focusing screen.

2. An automatic focusing detection apparatus as set forth in claim 1, wherein:
said focusing detection areas include a central area and a plurality of areas adjacent to said central area;
said focused-state detection means includes a plurality of CCDs each for detecting the focus state of said subject in a corresponding one of said plurality of focusing detection areas;
each focus detection signal is derived from a corresponding CCD; and
said control means controls said lens driving means based on said plurality of focus detection signals when said first focusing screen is detected, and controls said lens driving means based on the focus detection signal derived from the CCD for detecting the focus state of said central area when said second focusing screen is detected.

3. An automatic focusing detection apparatus for a camera of the type having lens driving means for automatically moving a photographic lens to a position at which a subject is sharply focused, comprising:
focused-state detection means for detecting a focus state of said subject in each of a plurality of focusing detection areas defined by dividing an image field, and for providing a corresponding plurality focus detection signals;
focusing adjustment mode selection means for selecting an automatic focusing adjustment mode and a manual focusing adjustment mode; and
control means for controlling said lens driving means based on said plurality of focus detection signals in response to the selection of said automatic focusing adjustment mode by said focusing adjustment mode selection means, and for enabling manual focusing of said lens based on the focus detection signal corresponding to a predetermined one of said focusing detection areas in response to the selection of said manual focusing adjustment mode by said focusing adjustment mode selection means.

4. An automatic focusing detection apparatus as set forth in claim 3, wherein:
said focusing detection areas include a central area and a plurality of areas adjacent to said central area;
said focused-state detection means includes a plurality of CCDs each for detecting the focus state of a corresponding one of said focusing detection areas;
each focusing detection signal is derived from a corresponding CCD; and
said control means controls said lens driving means based on the focus detection signals derived from said plurality of CCDs when said focusing adjustment selection means selects said automatic focusing adjustment mode, and enables manual focusing of said lens based only on the focus detection signal derived from the CCD for detecting the focus state of said central area when said focusing adjustment selection means selects said manual focusing adjustment mode.

5. An automatic focusing detection apparatus for a camera of the type having lens driving means for automatically moving a photographic lens to a position at which a subject is sharply focused, comprising:
focused-state detection means for detecting the focus state of said subject in each of a plurality of focusing detection areas defined by dividing an image field, and for providing a corresponding plurality of focus detection signals;
exposure mode selection means capable of selecting at least one automatic exposure control mode and a manual exposure control mode; and
control means for controlling said lens driving means based on the focus detection signals corresponding to said plurality of focusing detection areas in response to the selection of said automatic exposure control mode by said exposure mode selection means, and for controlling said lens driving means based on the focus detection signal corresponding to a predetermined one of said focusing detection areas in response to the selection of said manual exposure control mode by said exposure mode selection means.

6. An automatic focusing detection apparatus as set forth in claim 5, wherein:
said focusing detection areas include a central area and a plurality of areas adjacent to said central area;
said focused-state detection means includes a plurality of CCDs each for detecting the focus state of said subject in a corresponding one of said focusing detection areas;
each focus detection signal is derived from a corresponding CCD; and
said control means controls said lens driving means based on the focus detection signals derived from said plurality of CCDs when said exposure mode selection means selects said automatic exposure control mode, and controls said lens driving means based only on the focus detection signal derived from the CCD for detecting the focus state of said central area when said exposure mode selection means selects said manual exposure control mode.

7. An automatic focusing detection apparatus for a camera of the type having lens driving means for automatically moving a photographic lens to a position at which a subject is sharply focused, comprising:
light measurement means for measuring the brightness of a subject in each of a plurality of light measurement areas defined by dividing an image field;
focusing adjustment state detection means for obtaining focusing adjustment information from each of a plurality of focusing detection areas substantially corresponding to said light measurement areas;
first arithmetic operation means for determining an exposure value based on light measurement principally from a selected one or more of said light measurement areas;
second arithmetic operation means for evaluating focusing adjustment information from a focusing detection area or areas selected according to the one or more light measurement areas selected and corresponding to said selected one or more light measurement areas, and for determining a moving amount to focus said lens in accordance with focusing adjustment information from a selected one such focusing detection area; and
control means for controlling said lens driving means in accordance with an output signal delivered from said second arithmetic operation means to move said lens by said moving amount.

8. An automatic focusing detection apparatus as set forth in claim 7, wherein said focusing detection areas are in one-to-one correspondence with said light measurement areas.

9. An automatic focusing detection apparatus as set forth in claim 7, wherein:
when principally one light measurement area is used for obtaining said exposure value, said second arithmetic operation means determines said moving amount of said photographic lens based on focusing adjustment information from a focusing detection area corresponding to that one light measurement area; and
when principally a plurality of light measurement areas are used for obtaining said exposure value, said second arithmetic operation means determines said moving amount of said photographic lens based on focusing adjustment information from focusing detection areas corresponding to that plurality of light measurement areas.

10. An automatic focusing detection apparatus as set forth in claim 7, wherein:
said light measurement means includes photometer means with a plurality of light incident areas for measuring brightness of said subject in each of said plurality of light measurement areas;
said light measurement areas include a central light measurement area and light measurement areas adjacent to said central light measurement area; and
said focusing adjustment state detection means includes a plurality of line sensors for measuring subject distances in said plurality of focusing detection areas.

11. An automatic focusing detection apparatus as set forth in claim 10, wherein said focusing detection areas are defined by a central line sensor and adjacent line sensors in one-to-one correspondence with said light measurement areas.

12. An automatic focusing detection apparatus as set forth in claim 10, wherein:
said first arithmetic operation means performs one of center-weighted light measurement, low-brightness-weighted light measurement, and arithmetic mean light measurement; and
said second arithmetic means determines said moving amount of said photographic lens based on an output signal from a line sensor used for subject distance measurement in a focusing detection area corresponding to said central light measurement area when said first arithmetic operation means performs center-weighted light measurement, based on an output signal from one or more line sensors used for measuring subject distance in one or more focusing detection areas corresponding to one or more low brightness light measurement areas when said first arithmetic operation means performs low-brightness-weighted light measurement, and based on output signals from line sensors used for measuring subject distances in a plurality of focusing detection areas corresponding to a plurality of said light measurement areas used in obtaining said exposure value when said first arithmetic operation means performs arithmetic mean light measurement.

13. An automatic focusing detection apparatus for a camera of the type having lens driving means for automatically moving a photographic lens to a position at which a subject is sharply focused, comprising:

light measurement means for carrying out light measurements through a plurality of light measurement areas defined by dividing a wide area of an image field into a narrow light measurement area at a central portion of said image field and at least one additional light measurement area adjacent to said narrow light measurement area;
focusing adjustment state detection means for obtaining focusing adjustment information from each of a plurality of focusing detection areas substantially corresponding to said light measurement areas;
mode selection means for selecting a narrow area light measurement mode for measuring light through said narrow light measurement area and a wide area light measurement mode for measuring light through said plurality of light measurement areas; and
control means responsive to selection of said narrow area light measurement mode by said mode selection means for carrying out an arithmetic operation to determine an exposure value based on light measurement through said narrow light measurement area and an operation to determine a moving amount to focus said photographic lens based on focusing adjustment information from a focusing detection area corresponding to said narrow light measurement area, and responsive to selection of said wide area light measurement mode by said mode selection means for carrying out an operation to determine an exposure value based on light measurement through said plurality of light measurement areas and an operation using focusing adjustment information from said plurality of focusing detection areas to determine a moving amount to focus said photographic lens based on focusing adjustment information from a selected one of said plurality of focusing detection areas,
said lens driving means being controlled in accordance with the focusing adjustment information used to determine the moving amount of said photographic lens.

14. An automatic focusing detection apparatus as set forth in claim 13, wherein:
said light measurement areas include a plurality of said additional light measurement areas;
said light measurement means includes photometer means with a plurality of light incident areas for measuring brightness of a subject in each of said narrow light measurement area and said additional light measurement areas; and
said focusing adjustment state detection means includes a plurality of line sensors for measuring subject distances in said plurality of focusing detection areas.

15. An automatic focusing detection apparatus as set forth in claim 14, wherein said focusing detection areas are defined by a central line sensor and adjacent line sensors in one-to-one correspondence with said light measurement areas.

16. An automatic focusing detection apparatus as set forth in claim 14, wherein said control means includes:
first arithmetic operation means for obtaining an exposure value by one of center-weighted light measurement, low-brightness-weighted light measurement, and arithmetic means light measurement; and
second arithmetic operation means for determining the moving amount of said photographic lens based upon an output signal from a line sensor used for measuring subject distance in a focusing detection area corresponding to said narrow light measurement area when said exposure value is obtained by center-weighted light measurement, and based upon an output signal from a line sensor representing a subject distance which is shortest among the subject distances measured with a selected group of said line sensors when said exposure value is obtained by low-brightness-weighted light measurement or arithmetic mean light measurement.

* * * * *